(12) United States Patent
Spiegel et al.

(10) Patent No.: US 12,730,333 B2
(45) Date of Patent: Sep. 8, 2026

(54) METHOD FOR DETERMINING AN OPHTHALMIC LENS

(71) Applicant: ESSILOR INTERNATIONAL, Charenton-le-Pont (FR)

(72) Inventors: Daniel Spiegel, Singapore (SG); Bjorn Drobe, Singapore (SG); Alain Goulet, Ormesson sur Marne (FR); Sébastien Fricker, Creteil (FR); Matthieu Guillot, Issy les Moulineaux (FR)

(73) Assignee: Essilor International, Charenton-le-pont (FR)

( * ) Notice: Subject to any disclaimer, the term of this patent is extended or adjusted under 35 U.S.C. 154(b) by 254 days.

(21) Appl. No.: 18/719,207

(22) PCT Filed: Dec. 13, 2022

(86) PCT No.: PCT/EP2022/085675
§ 371 (c)(1),
(2) Date: Jun. 12, 2024

(87) PCT Pub. No.: WO2023/110909
PCT Pub. Date: Jun. 22, 2023

(65) Prior Publication Data

US 2025/0044615 A1 Feb. 6, 2025

(30) Foreign Application Priority Data

Dec. 16, 2021 (EP) .................................... 21306806

(51) Int. Cl.
*G02C 7/02* (2006.01)

(52) U.S. Cl.
CPC ............... *G02C 7/027* (2013.01); *G02C 7/02* (2013.01)

(58) Field of Classification Search
None
See application file for complete search history.

(56) References Cited

U.S. PATENT DOCUMENTS 7,347,546 B2 3/2008 Esser et al.
8,540,365 B2 9/2013 Varnas
(Continued)

FOREIGN PATENT DOCUMENTS

CN 201804169 U 4/2011
CN 106291976 A 1/2017
(Continued)

OTHER PUBLICATIONS

International Search Report for PCT/EP2022/085675, mailed Mar. 29, 2023, 4 pages.
(Continued)

*Primary Examiner* — Darryl J Collins
(74) *Attorney, Agent, or Firm* — NIXON & VANDERHYE

(57) ABSTRACT

The invention relates to a method for determining an ophthalmic lens for a wearer and suitable for correcting the wearer's vision, comprising c) determining a virtual lens by an optimization process involving calculating iteratively a surface of the virtual lens so as to match target optical characteristics of a target lens, checking whether peripheral defocus values of the virtual lens satisfy a predetermined criterion, and if the predetermined criterion is not satisfied, reiterating the calculation of the surface of the virtual lens after modifying the target lens of the previous iteration. The determined ophthalmic lens is defined as being the virtual lens at the end of the optimization process. The invention also relates to an ophthalmic lens for a wearer for correcting the wearer's vision and intended to reduce peripheral defocus.

15 Claims, 4 Drawing Sheets

(56) References Cited

U.S. PATENT DOCUMENTS

| | | | | |
|---|---|---|---|---|
| 10,451,894 | B2* | 10/2019 | Calixte | G02C 7/061 |
| 2007/0115431 | A1 | 5/2007 | Smith, II et al. | |
| 2023/0145888 | A1* | 5/2023 | Irazusta | A61B 3/0025 351/239 |
| 2023/0273458 | A1* | 8/2023 | Qi | G02C 7/022 351/159.74 |
| 2023/0381810 | A1* | 11/2023 | Ishizaki | B05D 5/06 |

FOREIGN PATENT DOCUMENTS

| | | | |
|---|---|---|---|
| DE | 102009053467 | B4 | 1/2018 |
| EP | 1934648 | A1 | 6/2008 |
| EP | 2069854 | B1 | 4/2015 |
| EP | 3472661 | B1 | 10/2019 |
| WO | 2007041796 | A1 | 4/2007 |
| WO | 2008079150 | A1 | 7/2008 |
| WO | 2012007064 | A1 | 1/2012 |
| WO | 2012173891 | A1 | 12/2012 |
| WO | 2016091853 | A1 | 6/2016 |
| WO | 2021198362 | A1 | 10/2021 |

OTHER PUBLICATIONS

Written Opinion of the ISA for PCT/EP2022/085675, mailed Mar. 29, 2023, 5 pages.

Robert Rosen et al., "Influence of Optical Defocus on Peripheral Vision", IOVS, Visual Psychophysics and Physiological Optics, vol. 52, No. 1, Jan. 2011, 6 pages.

David Troilo et al., "IMI—Report on Experimental Models of Emmetropization and Myopia", Investigative Ophthalmology & Visual Science (IOVS), Special Issue, vol. 60, No. 3, Copyright 2019 The Authors, 58 pages.

Christine F. Wildsoet et al., "IMI—Interventions for Controlling Myopia Onset and Progression Report", Investigative Ophthalmology & Visual Science (IOVS), Special Issue, vol. 60, No. 3, Copyright 2019 The Authors, 26 pages.

* cited by examiner

METHOD FOR DETERMINING AN OPHTHALMIC LENS

CROSS-REFERENCE TO RELATED APPLICATIONS

This application is the U.S. national phase of International Application No. PCT/EP2022/085675 filed Dec. 13, 2022, which designated the U.S. and claims priority to EP 21306806.7 filed Dec. 16, 2021, the entire contents of each of which are hereby incorporated by reference.

TECHNICAL FIELD OF THE INVENTION

The invention relates to the fields of optical lenses for correcting abnormal refraction of the eye.

More precisely, the invention relates to a method for determining an ophthalmic lens intended to be worn in front of an eye of a wearer for correcting the wearer's vision.

The invention relates also to an ophthalmic lens determined by using this method.

BACKGROUND INFORMATION AND PRIOR ART

Some visual defects, such as myopia, or hyperopia, evolve with time.

Myopia of an eye is characterized by the fact that the eye focuses light in front of the retina. Hyperopia of an eye is characterized by the fact that the eye focuses light behind the retina. In other words, a myopic eye or a hyperopic eye presents a length that is not suitable for clear vision.

Peripheral hyperopic defocus is the condition where peripheral vision is focused behind the back of the eye's light receptors located in the retina. Studies indicated that peripheral hyperopic defocus is a potent signal for eye growth and, and thus favors myopia evolution. Standard single vision lenses correcting myopia present the drawback, together with the optical system of the eye, to introduce a considerable amount of peripheral hyperopic defocus.

Several solutions exist that aim at reducing peripheral hyperopic defocus. Some are invasive, such as orthokeratology, or the use of bifocal or multifocal contact lenses. Other solutions rely on ophthalmic lens design aiming at eliminating the peripheral hyperopic defocus. The European patent EP 2 069854 B1 describes a progressive lens element whose mean power throughout the peripheral region is positive relative to that of the upper viewing zone at all radial extents greater than 20 mm from the geometric center of the lens element. The patent application US 2007/011543 discloses an optical lens controlling optical aberrations to alter peripheral defocus.

SUMMARY OF THE INVENTION

One object of the invention is to provide an ophthalmic lens able to reduce peripheral hyperopic defocus in order to slow down myopia evolution.

The above object is achieved according to the invention by a method for determining an ophthalmic lens for a wearer and suitable for correcting the wearer's vision, the method comprising the steps of:

a) obtaining wearing data including prescription data pertaining to an eye of the wearer, b) defining an initial ophthalmic lens having a front surface and a rear surface such that the initial ophthalmic lens complies with the prescription data for a given central vision gaze direction, c) determining a virtual lens by an optimization process comprising the following sub-steps:

c1) defining a target lens, c2)—defining one defined surface among the front surface of the virtual lens and the rear surface of the virtual lens to be identical to a counterpart surface of the initial ophthalmic lens among the front surface or the rear surface of the initial ophthalmic lens, modifying the other surface of the virtual lens so as to match target optical characteristics of a target lens, checking whether peripheral defocus values of the virtual lens satisfy a predetermined criterion, c3) if the predetermined criterion is not satisfied, reiterating successively sub-steps c1), c2) and c3).

d) determining the ophthalmic lens as being the virtual lens at the end of step c).

The method according to the invention allows, by the use of an iteratively modified target lens in an optimization process, for designing an ophthalmic lens with reduced peripheral defocus. The method according to the invention provide dioptric correction to the wearer while providing low values of peripheral defocus.

In an embodiment:

in sub-step c1), the target lens is defined by:

defining the front surface and the base curve of the target lens, calculating the rear surface of the target lens so that the target lens complies with the prescription data at a given gaze direction, calculating target optical characteristics of the target lens over a set of central gaze directions, in sub-step c2):

the defined surface is the front surface of the virtual lens, modifying the other surface of the virtual lens comprises optimizing the rear surface of the virtual lens so as to minimize the difference between virtual optical characteristics of the virtual lens and the target optical characteristics of the target lens over said set of central gaze direction.

In an embodiment:

in sub-step c2) the peripheral defocus values are calculated for at least one set of given peripheral gaze directions.

For example, the at least one set of given peripheral gaze direction is comprised within a cone having an apex located at the wearer's eye pupil or the eye rotation center and surrounding at least one given central gaze direction amongst said set of central gaze directions.

in sub-step c3), reiterating sub-step c1) comprises modifying the base curve of the target lens with respect to the value of the previous iteration.

Modifying the base curve of the target lens helps decreasing the peripheral defocus value of the virtual lens.

For example, wherein the predetermined criterion is at least one of the following: a maximum absolute value of the calculated peripheral defocus values, a mean absolute value of the calculated peripheral defocus values, or a predetermined number of iterations of sub-steps c1), c2) and c3).

For example, the given central gaze direction is the primary gaze direction.

For example, the cone having an apex located at the wearer's eye pupil or the eye rotation center has a half-angle of more than 25 degrees.

In an embodiment, step c) further comprises a sub-step c21) preceding sub-step c3) consisting of, checking whether a central vision optical characteristics of the virtual lens satisfies the predetermined criterion.

Therefore, the method according to the invention allows reducing the residual peripheral defocus while maintaining reasonable optical performance of the optical system formed by the ophthalmic lens determined by the method according to the invention and the wearer's eye.

For example, the central vision optical characteristics is based on the mean spherical power value, and:

in a given radius from the distance reference point of the ophthalmic lens, the optical power of the ophthalmic lens does not differ from the prescribed mean spherical power value by more than:

0.125 diopter when the prescription data comprise a prescribed mean spherical power value between −6 diopters and +4 diopters, or 0.25 diopter when the prescription data comprise a prescribed mean spherical power value below −6 diopters or above +4 diopters.

For example, the base curve of the initial ophthalmic lens is comprised between 3 diopters and 8 diopters considering a reference refractive index of 1.53.

In some embodiments:

in step a) the wearing data further comprise wearing parameters of the ophthalmic lens, the target lens is further defined by defining target wearing parameters such as a pantoscopic tilt angle, a wrap angle of the target lens and the distance between the target lens and the wearer's eye, in sub-step c3), reiterating sub-step c1) further comprises modifying the target wearing parameters.

In some embodiments, in step a), the wearing data further comprise mounting parameters of the ophthalmic lens, the target lens is further defined by defining target mounting parameters such as a location of a fitting cross of the target lens, in sub-step c3), reiterating sub-step c1) further comprises modifying the target mounting parameters.

Therefore, the method according to the invention allows personalizing the ophthalmic lens by taking into account target wearing parameters and target mounting parameters. In addition, the ophthalmic lens thickness is comparable to standard single vision lenses with low base curves and thus ensures good aesthetics.

In some embodiments:

the prescription data comprise a prescribed mean spherical power value and, in sub-step c2) calculating the peripheral defocus values of the virtual lens comprises the steps of:

defining an ergorama function associating each peripheral gaze direction in said cone to an object point and to the distance between said object point and the wearer, for each peripheral gaze direction:

computationally propagating a peripheral ray departing from the associated object point through the virtual lens and the wearer's eye pupil center or eye rotation center and computing a peripheral mean optical power, computing the difference between the prescribed mean spherical power value and the peripheral mean optical power, computing the peripheral defocus value by adding from said difference a modelled eye defocus value at said peripheral gaze direction.

One further aspect of the invention pertains to an ophthalmic lens determined by the method according to the invention as previously described.

The invention also relates to an ophthalmic lens, having an aspherical rear face, a rotationally symmetrical front face and a base curve higher than 3 diopters, matching prescription data pertaining to an eye of a wearer at a primary reference point, characterized in that said ophthalmic lens presents, for a set of peripheral gaze directions comprised within a cone of half-angle 30° having an apex located at the wearer's eye pupil center or eye rotation center and surrounding a central vision gaze direction corresponding to the primary reference point, peripheral defocus values reduced in comparison to another ophthalmic lens comprising a front face identical to the front surface of the ophthalmic lens and a sphero-torical rear face, wherein the other ophthalmic lens matches the prescription data at the primary reference point.

In some embodiments, the peripheral defocus values of the ophthalmic lens are reduced by more than 10% with respect to the other ophthalmic lens.

DETAILED DESCRIPTION OF ONE EXAMPLE

The following description, enriched with joint drawings that should be taken as non-limitative examples, will help understand the invention and figure out how it can be realized.

Figure 5A:
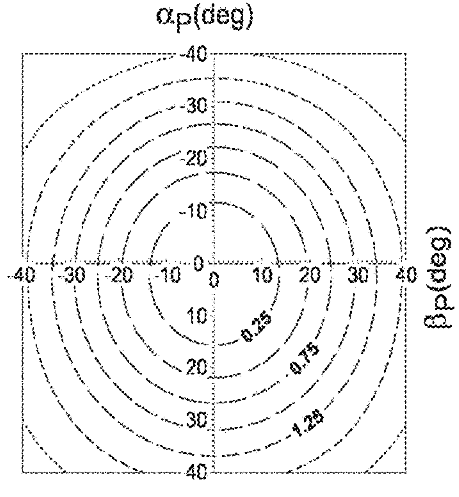
Figure 5B:
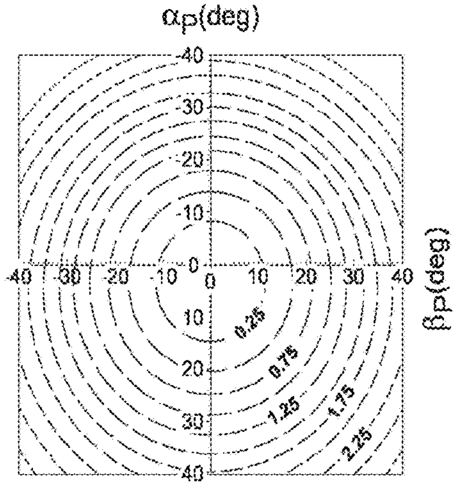
Figure 5C:
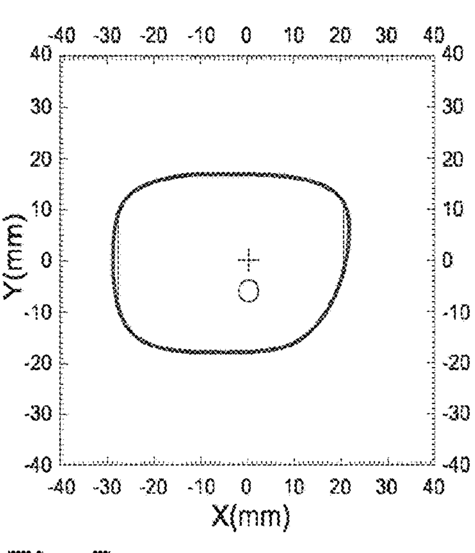
Figure 5D:
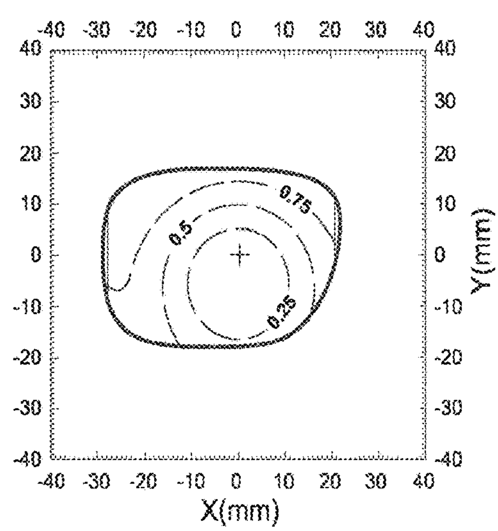

FIGS. 5*a* and 5*b* represent maps of peripheral defocus values for respectively an ophthalmic lens determined by the method according to the invention and a commercial lens;

FIGS. 5*c* and 5*d* represent respectively a map of the optical power of the residual astigmatism of the optical system formed by the ophthalmic lens and a wearer's eye for the commercial lens of FIG. 5*b;*

Figure 5E:
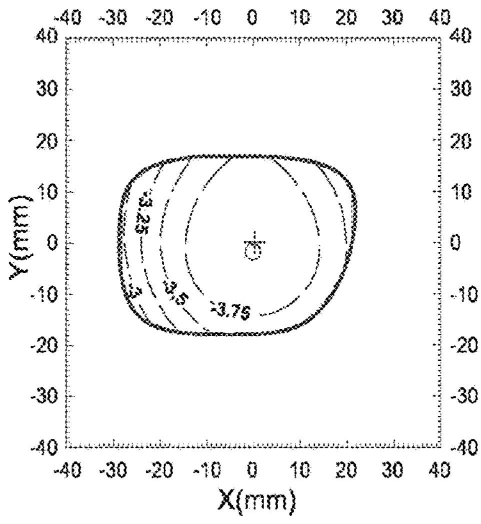
Figure 5F:
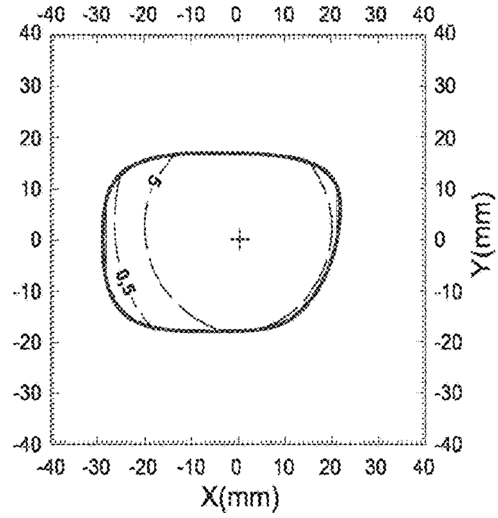

FIGS. 5*e* and 5*f* represent respectively a map of the optical power and a map of the residual astigmatism of the optical system formed by the ophthalmic lens and a wearer's eye for the ophthalmic lens determined by the method according to the invention of FIG. 5*a;*

Figure 6A:
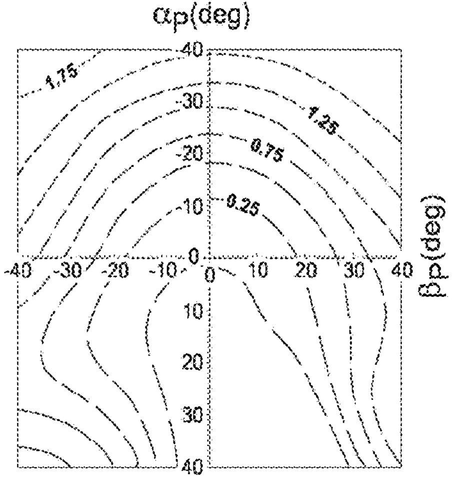
Figure 6B:
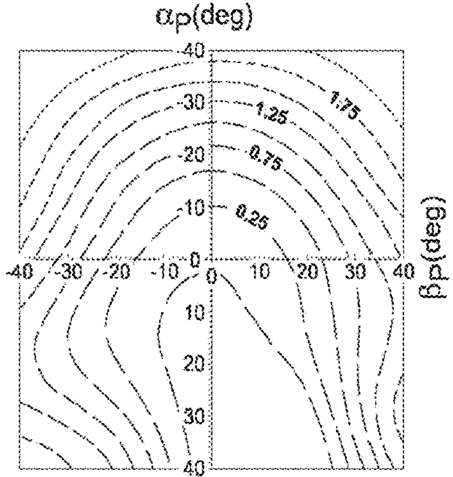
Figure 7A:
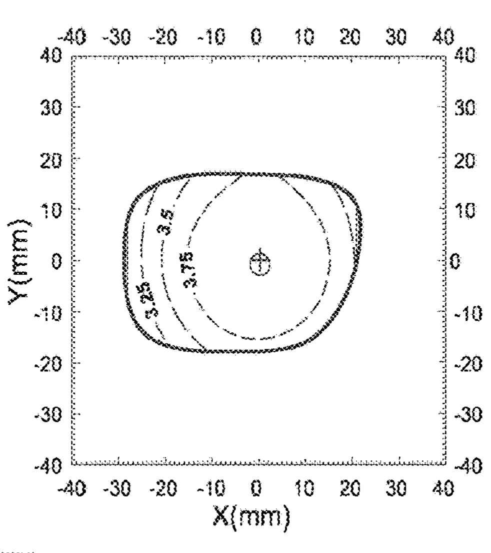
Figure 7B:
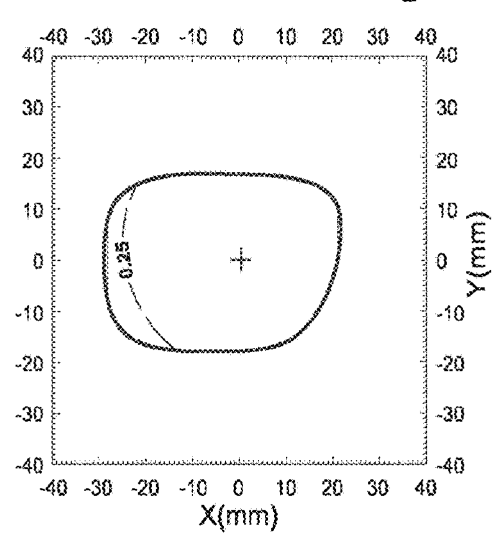
Figure 7C:
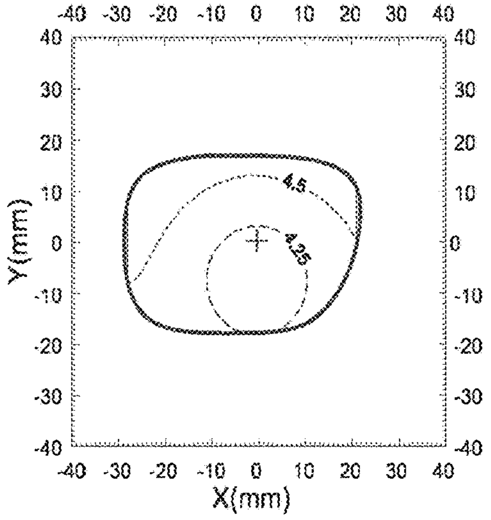
Figure 7D:
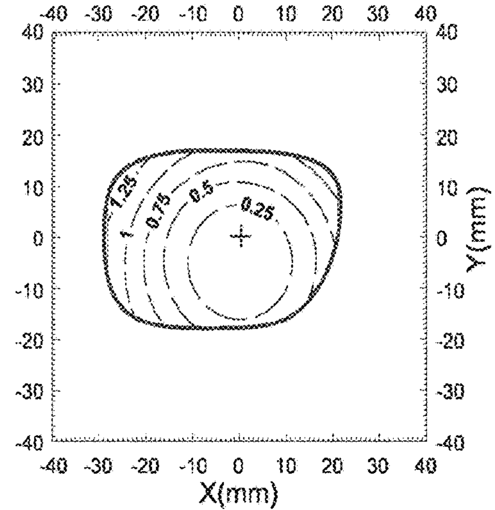

FIGS. 6*a* and 6*b* represent maps of peripheral defocus values for respectively an ophthalmic lens according to the invention and a commercial lens;

FIGS. 7*a* and 7*b* represent respectively a map of optical power and a map of residual astigmatism of the optical system formed by the ophthalmic lens determined by the method according to the invention and a wearer's eye;

FIGS. 7*c* and 7*d* represent respectively a map of optical power and a map of residual astigmatism of the optical system formed by the commercial lens and a wearer's eye.

The following definitions are given in the frame of this disclosure.

One considers an eye of a wearer and an ophthalmic lens 1 worn in front of the wearer's eye. The ophthalmic lens 1 consists of a transparent medium limited by a front surface and a rear surface. The front surface corresponds to the surface farther from the wearer's eye, while the rear surface corresponds to the face closer to the wearer's eye. The wearer's eye is modelled by its rotation center ERC and its pupil center position P, and the distances of the eye rotation center ERC and of the pupil center P to the ophthalmic lens vertex V. The ophthalmic lens vertex V is defined as the center of the rear surface of the ophthalmic lens, where the rear surface of the ophthalmic lens is the surface of the ophthalmic lens closest to the wearer's eye.

The primary gaze direction is defined by the orientation of the wearer's eye when the wearer looks straight ahead, that is to say that the primary gaze direction corresponds substantively to the horizontal axis passing through the eye rotation center ERC and extending in front of the wearer.

Figure 1:
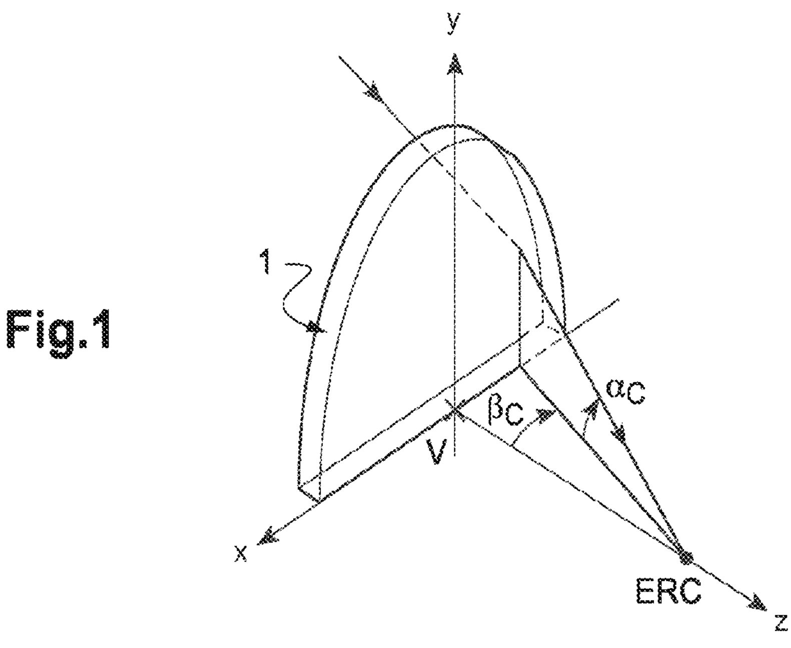
FIG. 1 shows, diagrammatically, an optical system comprising a wearer's eye and an ophthalmic lens in front of the wearer's eye, and ray tracing from the center of rotation of the eye to the ophthalmic lens.

A central vision gaze direction is defined by two angles ($\alpha_C$, $\beta_C$) representing the eye rotation from the primary gaze direction. More precisely, the angles $\beta_C$ and $\alpha_C$ represent respectively the horizontal and vertical rotation angles applied at the eye rotation center ERC in a Fick system to move the eye from the primary gaze reference axes to the eye gaze axes. A third torsional rotation of the eye derived from these two angles is applied so that the eye gaze axes respect Listing law. FIG. 1 illustrates an example for the angles $\alpha_C$ and $\beta_C$ with respect to the eye rotation center ERC and the worn ophthalmic lens. The central vision gaze direction can be represented by a line passing through the eye rotation center ERC.

The angle $\alpha_C$ is defined in the vertical plane passing through the eye rotation center ERC, while the angle $\beta_C$ is defined in the horizontal plane passing through the eye rotation center ERC. The angle $\alpha_C$ is defined as positive when the wearer's eye looks down and negative when the wearer's eye looks up. The angle $\beta_C$ is defined as positive when the wearer's eye looks to the nasal side and negative when the wearer's eye looks to the temporal side.

Figure 2:
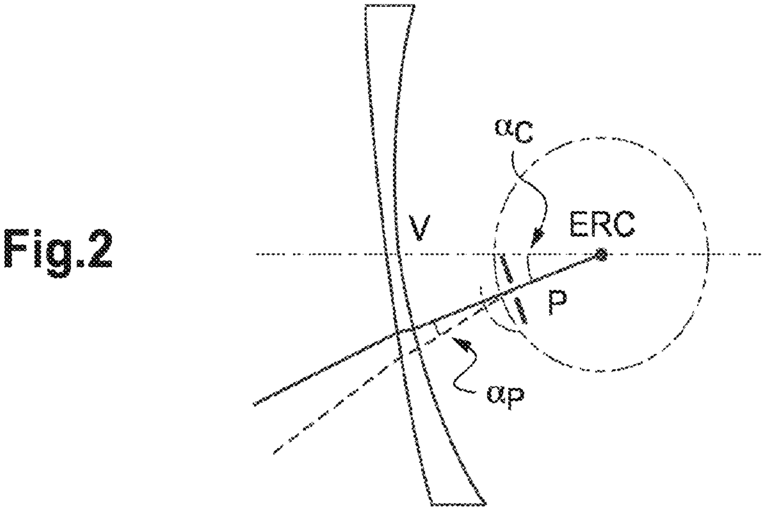
FIG. 2 shows the geometrical referential used in the frame of this disclosure.

A peripheral gaze direction is defined, for a given central gaze direction ($\alpha_C$, $\beta_C$), by two angles ($\alpha_P$, $\beta_P$) representing the angle made by the direction of a peripheral ray passing through the pupil center P with the given central gaze direction ($\alpha_C$, $\beta_C$). The peripheral gaze direction can be represented by a ray passing through the eye pupil. FIG. 2 illustrates an example for the angle $\alpha_P$ for a given central gaze direction represented by an angle $\alpha_C$. The angle $\alpha_P$ is considered as positive when the ray enters the pupil from below, and negative when the ray enters the pupil from above. The angle $\beta_P$ is considered as positive when the ray enters the pupil from the nasal side, and negative when the ray enters the pupil from the temporal side.

Peripheral defocus for a given peripheral gaze direction ($\alpha_P$, $\beta_P$) corresponds to the distance between the intersection of the peripheral ray with the retina of the wearer's eye and the peripheral ray focusing point. In practice, peripheral defocus value is measured in diopters.

Figure 3:
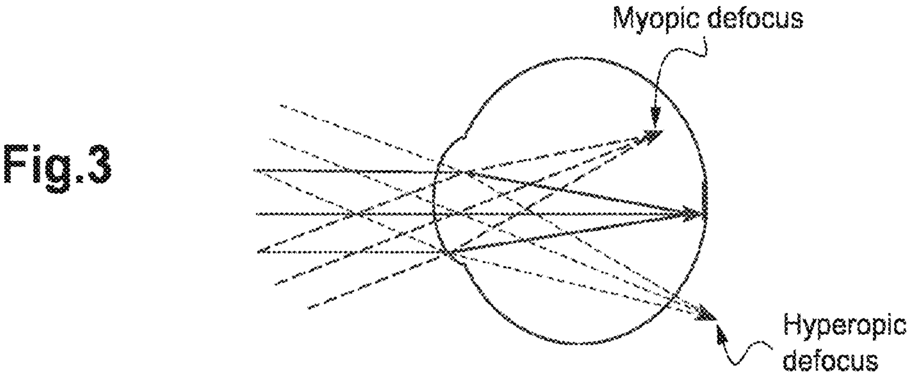
FIG. 3 is an illustration of the concept of peripheral defocus.

FIG. 3 illustrates both peripheral hyperopic defocus and peripheral myopic defocus. In the case of peripheral hyperopic defocus, light entering into the eye and reaching the periphery of the retina focuses behind the retina. In the case of peripheral myopic defocus, light entering into the eye and reaching the periphery of the retina focuses in front of the retina.

Prescription data of a wearer refer to one or more data obtained for the wearer, for instance measured by an eye care practitioner, and indicating for at least one eye of the wearer of both eyes of the wearer a prescribed sphere SPH, optionally a prescribed astigmatism value CYL and a prescribed axis AXIS suitable for correcting the abnormal refraction of one eye, or both eyes of the wearer. The term "prescribed mean sphere" is defined as MeanSphere=SPH+CYL/2.

The eye peripheral defocus EyePeripheralDefocus is a function of the peripheral gaze direction that models the average eye peripheral refractive error. Myopic naked eyes present peripheral hyperopic defocus, i.e., light entering the myopic eye and reaching the peripheral region of the retina focuses behind the retina. The eye peripheral defocus model for a myopic naked eye may be modelled by a symmetrical function, for example, a polynomial function, with the eye peripheral refractive error increasing with the increase of the peripheral gaze direction angle. For example, the eye peripheral defocus equals 0.8 diopters for a peripheral gaze direction of +/−30 degrees and a myopia of −4 diopters. On the contrary, hyperopic naked eyes present peripheral myopic defocus, i.e., light entering the hyperopic eye and reaching the peripheral region of the retina focuses in front of the retina. The eye peripheral defocus model for a hyperopic naked eye may be modelled also by a symmetrical function. In this case, the absolute value of the eye peripheral refractive error increases as the peripheral gaze direction angle increases.

In the frame of this disclosure, the residual peripheral defocus value for a given peripheral gaze direction ($\alpha_P$, $\beta_P$) that is wanted to be reduced is computed by the following steps:

- Evaluating the dioptric power of the lens in the given peripheral gaze direction ($\alpha_P$, $\beta_P$), PpoPeripheral($\alpha_P$, $\beta_P$);
- Computing the difference PowerError($\alpha_P$, $\beta_P$) between the power provided by the lens power in the given peripheral gaze direction ($\alpha_P$, $\beta_P$) and the prescribed mean sphere: PowerError($\alpha_P$, $\beta_P$)=PpoPeripheral($\alpha_P$, $\beta_P$)−MeanSphere,
- Computing the residual peripheral defocus value PeripheralDefocus($\alpha_P$) for the given peripheral gaze direction ($\alpha_P$, $\beta_P$) by computing the difference: PeripheralDefocus($\alpha_P$)=EyePeripheralDefocus($\alpha_P$, $\beta_P$)−PowerError ($\alpha_P$, $\beta_P$).

If the quantity PowerError($\alpha_P$, $\beta_P$) is zero, and in the case of a myopic naked eye, the residual peripheral defocus is positive: the eye has peripheral hyperopic defocus.

In the following, it will be described a method for determining an ophthalmic lens 1 intended for a wearer for correcting the wearer's vision and intended to reduce the peripheral hyperopic defocus of the eye of the wearer resulting from the difference between his natural peripheral defocus (i.e. with naked eye) and the peripheral defocus introduced by the ophthalmic lens 1. In the case of a myopic wearer, it is foreseen, that, by wearing the determined ophthalmic lens 1, the myopia evolution of the wearer's eye myopia will be slowed down.

Terms such as "computing", "calculating" "generating", or the like, refer to the action and/or processes of a computer or computing system, or similar electronic computing device, that manipulate and/or transform data represented as physical, such as electronic, quantities within the computing system's memories into other data similarly represented as physical quantities within the computing system's memories, registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to implement the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

In what follows, the expression "peripheral defocus value" is used to refer to the "residual peripheral defocus value", unless otherwise specified.

The method starts with a step a) of obtaining wearing data of the wearer. In particular, the wearing data of the wearer include the wearer's prescription data: the prescribed sphere SPH, the prescribed cylinder CYL and the corresponding AXIS. For instance, the wearer's prescription data can be measured by an eye care practitioner. The wearing data of the wearer also include wearing parameters of the ophthalmic lens 1 such as a pantoscopic tilt angle, a wrap angle and the distance between the ophthalmic lens 1 and the wearer's eye. The wearing data of the wearer also include mounting parameters such as a fitting height, the half or full interpupillary distance and the frame shape.

The ophthalmic lens 1 is intended to be placed and centered in front of the wearer' eye such that the axis ERC-V cuts the front face of the ophthalmic lens 1 on the fitting cross FC.

The ophthalmic lens 1 is intended to be worn by the wearer in a position and orientation defined by the pantoscopic angle and the wrap angle. The pantoscopic angle is the angle in the vertical plane between the normal to the front face of the ophthalmic lens at its boxed center and the primary central gaze direction (see ISO 13666:2012-§ 5.18). The wrap angle is the angle in the horizontal plane between the normal to the front surface of the ophthalmic lens at its boxed centre and the primary central gaze direction.

The ophthalmic lens 1 is intended to be mounted in a frame.

The method for determining the ophthalmic lens 1 intended to reduce peripheral defocus value comprises determining the optical design of the ophthalmic lens 1 by defining the shape of the front surface of the ophthalmic lens 1, and designing the rear surface of the ophthalmic lens 1 through an optimization process according to the invention. This particular embodiment will be described in what follows. However, the invention also encompasses the case where the shape of the rear surface of the ophthalmic lens 1 is defined, and where the front surface of the ophthalmic lens 1 is designed through a similar optimization process.

In a following step b), an initial ophthalmic lens is defined, the initial ophthalmic lens having a front surface and a rear surface so as to comply with the prescription data at a given central vision gaze direction.

In a step c), the method for determining the ophthalmic lens intended to reduce peripheral defocus enters into an optimization loop aiming at determining a so-called "virtual lens" LV. The front surface of the virtual lens is denoted as "virtual front surface" and the rear surface of the virtual lens is denoted as "virtual rear surface".

In a first sub-step c1) of step c), a target lens LT is defined.

In a second sub-step c2) of step c), one defined surface among the front surface of the virtual lens LV and the rear surface of the virtual lens LV is defined to be identical to the counterpart surface of the initial ophthalmic lens. In the presented case, the defined surface is the virtual front surface.

Then, the other surface of the virtual lens LV is modified to match the central vision optical performance of the target lens LT by iterations. In the presented case, the other surface is the virtual rear surface.

Then, peripheral defocus values of the virtual lens LV are calculated over at least one set of peripheral gaze directions. A check is then performed to assess whether the calculated peripheral defocus values satisfy a predetermined criterion. If the predetermined criterion is not satisfied, a third sub-step c3) of step c) is performed, where the first sub-step c1) of step c), the second sub-step c2) and the third sub-step c3) of step c) are successively reiterated. The ophthalmic lens will be determined at the end of the optimization loop, that is, at the end of step c), based on one of the virtual rear surfaces calculated during the optimization loop.

The sub-step c1) begins by defining the front surface and the base curve of the target lens LT. The front surface of the target lens LT is denoted as "target front surface" and the rear surface of the target lens LT is denoted as "target rear surface".

The front surface may be chosen as spherical, or aspherical.

In a first phase of sub-step c1), the base curve of the target lens LT, referred to as "target base curve" is defined as the Tscherning base. The shape of the target front surface could be, for instance, spherical or progressive. Then, in a second phase of phase c1), the shape of the target rear surface is calculated so that the target lens LT complies with the prescription data of the wearer in a given central gaze direction. The shape of the target rear surface can be for instance sphero-torical. The given central gaze direction may for instance be the primary gaze direction. Finally, in a third phase of sub-step c1), target optical characteristics of the target lens are calculated over a set of central gaze directions. By target optical characteristics, it is meant, for instance, values of mean optical power and residual astigmatism of the target lens LT at target lens LT wearing conditions over the set of central gaze directions. Illustrations of those quantities will be shown later in this disclosure.

The sub-step c2) begins by defining the front surface of the virtual lens of the virtual lens to be identical to the front surface of the initial ophthalmic lens. Preferably, a high base curve is chosen. The base curve of an ophthalmic lens or more generally a spectacle lens is here defined as in the ISO 13666:2019 standard. For instance, the base curve of the ophthalmic lens may be chosen between 3 and 8 diopters considering a refractive index of 1.53. Preferably, the base curve of the ophthalmic lens is chosen higher than 3.5 diopters. More preferably, the base curve of the ophthalmic lens is chosen higher than 5 diopters. Indeed, the inventors have discovered that this range of base curve values results in ophthalmic lenses efficient in reducing peripheral hyperopic defocus.

Then, the shape of the virtual rear surface is optimized by varying some of its geometrical parameters, so as to minimize the differences between virtual optical characteristics of the virtual lens and the target optical characteristics of the target lens over the set of central gaze directions. Such geometrical parameters as Zernike polynomials, and spline parameters are varied. The virtual optical characteristics of the virtual lens are the analogous optical characteristics as the target optical characteristics but evaluated for the virtual lens LV.

In an embodiment, the shape of the virtual rear surface is calculated such as to minimize the quadratic deviation between the optical characteristics of the virtual lens LV and the optical characteristics of the target lens LT. By way of non-limiting example, the deviation might be a root mean square deviation. By way of non-limiting example, the optimization process of said embodiment minimizes the following cost function for the virtual lens LV and it ends when the value of the cost function is lower than a given quantity:

$$MF = W_{PPO}\sum_{i=1}^{N}(PPO_{LV}(\alpha_{Ci},\beta_{Ci}) - PPO_{LT}(\alpha_{Ci},\beta_{Ci}))^2 + W_{ASR}\sum_{i=1}^{N}(ASR_{LV}(\alpha_{Ci},\beta_{Ci}) - ASR_{LT}(\alpha_{Ci},\beta_{Ci}))^2$$

where $PPO_{LV}$ is the mean optical power for the virtual target LV, $PPOT_{LT}$ is the mean optical power for the target lens LT, $ASR_{LV}$ is the residual astigmatism for the virtual target LV, $ASR_{LT}$ is the residual astigmatism for the target lens LT, $(\Delta_{Ci},\beta_{Ci})$ for i from 1 to N is a set of central gaze directions, $W_{PPO}$ is the weight of the mean optical power term of the merit function, $W_{ASR}$ is the weight of the residual astigmatism term of the merit function.

In another embodiment, such minimization could be achieved by setting a predetermined number of iterations. By way of non-limiting example, the number of iterations may be set to 10 or 20.

The succession of sub-steps c1) and c2) consists of minimizing, by iterations, the peripheral defocus value of the virtual lens in a distribution of peripheral gaze direction until a certain criterion is met.

In sub-step c2), for a given central gaze direction, the peripheral defocus values as previously defined are calculated over a set of given peripheral gaze directions within a revolution cone having an apex located at the wearer's eye pupil center and an axis following the given central direction. In a variant, the peripheral values are calculated over a set of given peripheral gaze directions within a revolution cone having an apex located at the wearer's eye rotation center and an axis following the given central vision gaze direction. The given central vision gaze direction may be the primary central gaze direction. In a variant, the given central gaze direction may be the central vision gaze direction inclined 20 degrees downwards with respect to the primary central gaze direction ($\alpha_C$=20 degrees). For instance, the revolution cone may have a half-angle higher than 10 degrees, preferably more than 20 degrees, even more preferably higher than 25 degrees.

After the calculation of the peripheral defocus values, it is checked whether a predetermined criterion is satisfied. There are usually more than one predetermined criterion, and the predetermined criteria could be of different kinds. The predetermined criterion may be a predetermined maximum number of iterations in the optimization loop process, for example, 10 times.

An additional predetermined criterion may be a result of a cost function which calculates a certain value from the calculated peripheral defocus values in sub-step c2). The certain value may be, for example, a maximum absolute value among the calculated peripheral defocus values in sub-step c2), for instance, 0.25D (diopters) at 30 degrees of eccentricity. The certain value may be, for another example, a mean absolute value of the calculated peripheral defocus values in sub-step c2), for instance, 0.125D.

If the predetermined criterion is satisfied in sub-step c3), which means at least when the iteration reaches the maximum number, or the result of the cost function reaches a minimum, the optimization loop ends. The determined ophthalmic lens has the optical design of the virtual lens at the end of the sub-step c3). More specifically, the determined ophthalmic lens has the front surface as defined at step a) and a rear surface identical to the rear surface of the virtual lens calculated at sub-step c2).

If the predetermined criterion is not satisfied in sub-step c2), a sub-step c3) is implemented consisting in re-iterating sub-steps c1), c2) and c3). More precisely, at sub-step c1), the target base curve is modified using for instance dichotomy or gradient descent or Newton's algorithms. For example, the target base curve is increased. Indeed, the inventors have discovered that increasing the target base curve helps the optimization process in decreasing the peripheral defocus of the wearer wearing the determined ophthalmic lens 1. For instance, the target base curve is higher than 5 diopters. More preferably, the target base curve is higher than 8 diopters.

The iteration is continued from the sub-step c1) to sub-step c3) where it is checked again whether the predetermined criterion is satisfied. The loop is reiterated until at least the optimization loop reaches the maximum number of iterations, or the result of the cost function reaches a minimum at the last iteration.

At the end of the last iteration, the determined ophthalmic lens is assigned the optical design of the virtual lens LV at the end of sub-step c2) of the last iteration. More specifically, the determined ophthalmic lens has the front surface as defined at step a) and the virtual rear surface calculated at the last optimization loop iteration.

More preferably, at the end of the optimization of sub-step c2), the optical design of the virtual lens LV with the lowest peripheral defocus value in the loop will be assigned as the determined ophthalmic lens.

In an embodiment, the method for determining the ophthalmic lens intended to reduce peripheral defocus according to the invention further comprises a sub-step c21) of checking whether a central vision optical characteristics of the virtual lens satisfies at least one of the above predetermined criteria. Besides, the central vision optical characteristics may be related to a power error criterion. The central vision optical characteristics may also pertain to a residual astigmatism value criterion. For instance, when the central vision optical characteristics is related to a power error criterion, a specific predetermined criterion might be the absolute difference between the prescribed mean spherical power and the optical power of the ophthalmic lens and in a given radius (e.g. 5 mm) from the distance reference point of the ophthalmic lens that should not differ by more than 0.125 diopter when the prescription data comprise a prescribed mean spherical power value between −6 diopters and +4 diopters, and more than 0.25 diopter when the prescription data comprise a prescribed mean spherical power value below −6 diopters or above +4 diopters. If the central vision optical characteristics does not meet the predetermined criterion, sub-steps c1) to c21) are reiterated.

In an embodiment, at sub-step c1), defining the target lens LT further comprises defining wearing parameters of the target lens LT, denoted as "target wearing parameters". The target wearing parameters include, for instance, a pantoscopic tilt angle, a wrap angle of the target lens and the distance between the target lens and the wearer's eye.

Numerical examples will be given further in this disclosure. When reiterating sub-step c1), the target base curve and the target wearing parameters are modified.

In another embodiment, at sub-step c1), defining the target lens LT further comprises defining mounting parameters of the target lens LT, denoted as "target mounting parameters". The target mounting parameters include, for instance, the location of a fitting cross of the target lens. When reiterating sub-step c1), the target base curve, target wearing parameters and target mounting parameters are modified.

Although the method above has been described in detail regarding the reduction of peripheral hyperopic defocus values in the case of myopic wearers, those skilled in the art will recognize that the method could also be implemented for determining an ophthalmic lens intended to be worn by a hyperopic wearer to reduce the residual peripheral myopic defocus.

Besides, the method previously described can also be applied to determine a contact lens. In this case, the central vision gaze direction corresponds to the primary gaze direction. The surface of the contact lens that is in contact with the cornea is fixed, while the front surface of the contact lens is optimized. During the optimization loop, the target wearing parameters and the target mounting parameters are fixed. For instance, the pantoscopic angle and the wrap angle are defined as equal to 0 degree.

Next, embodiments will be described to specifically describe the present disclosure. Needless to say, the present disclosure is not limited to the following embodiments.

Embodiment 1

Table 1a and Table 1b illustrate a first embodiment, wherein the ophthalmic lenses are single vision lenses Lens 1, Lens 2, Lens 3 and Lens 4, determined using the method of the invention. The lenses Lens 1 and Lens 2 have a prescribed sphere SPH value in the prescription data as −4 diopters, and the lenses Lens 3 and Lens 4 have a prescribed sphere SPH value in the prescription data as −6 diopters. Table 1a and Table 1b show the base curve values considering a refractive index of 1.53, target base curve values and the maximum peripheral defocus values of the lenses Lens 1, Lens 2, Lens 3 and Lens 4. The base curve value of the initial lens Lens 1, Lens 2, Lens 3 and Lens 4 is respectively the same value as the base curve value of the actual lens Lens 1, Lens 2, Lens 3 and Lens 4 shown in Table 1a and 1 b.

The determination of the lenses Lens 1, Lens 2, Lens 3 and Lens 4 is performed with the following wearing parameters and mounting parameters:

Fitting cross position: (0,0)

Pantoscopic angle: −8°

Wrap angle: 50

Distance between ophthalmic lens vertex and wearer's eye cornea: 12 mm.

The maximum peripheral defocus value is estimated over a set of peripheral gaze directions covering a cone of half-angle 30 degrees and surrounding the primary central gaze directions.

TABLE 1a

| SPH = −4D | | | |
|---|---|---|---|
| Lens | Base curve (D) | Target base curve (D) | Maximum Peripheral defocus value (D) |
| Lens 1 | 3.5 | 8.5 | 1.30 |
| Lens 2 | 5 | 8 | 1.23 |

TABLE 1b

| SPH −6D | | | |
|---|---|---|---|
| Lens | Base curve (D) | Target base curve (D) | Maximum Peripheral defocus value (D) |
| Lens 3 | 3.5 | 5 | 1.47 |
| Lens 4 | 5 | 5 | 1.36 |

As shown in Table 1a and Table 1 b, for a prescribed sphere SPH value of −4 diopters and of −6 diopters, by imposing a high base curve of 5 diopters for the Lens 2 and Lens 4, compared to base curve as 3.5 diopters for the lens 1 and lens 3, a decrease in the peripheral defocus value can be observed.

That is to say, decreasing the peripheral defocus value by imposing a high base curve on the ophthalmic lens is efficient whatever the prescribed sphere SPH value in the prescription data is.

Embodiment 2

Figure 4:
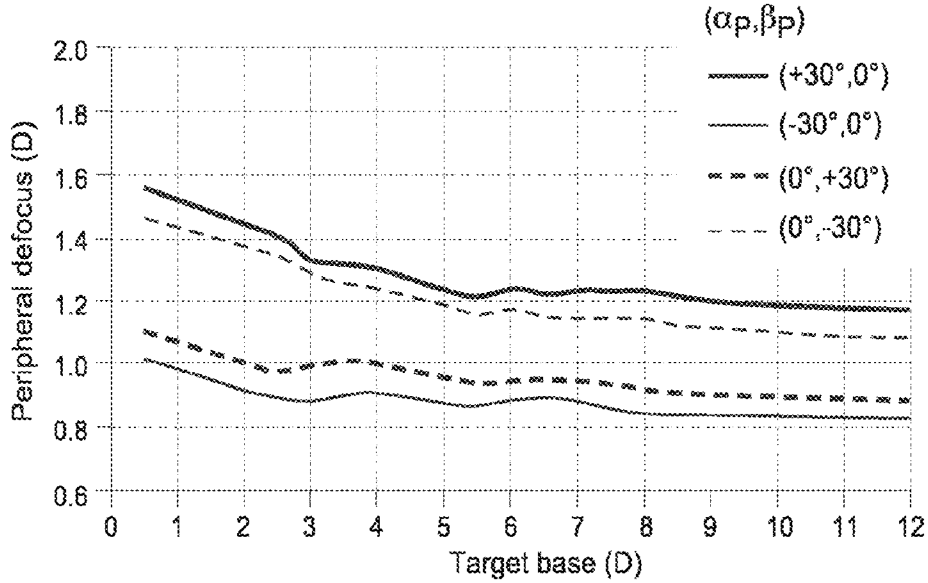
FIG. 4 is an illustration of the reduction in peripheral defocus as a function a base curve of a lens.

FIG. 4 illustrates a second embodiment, wherein the ophthalmic lens is a single vision lens 5 determined using the method of the invention. The lens 5 has a prescribed sphere SPH value of −4 diopters and a base curve of 5 diopters considering a refractive index of 1.53. The determination of the lens 5 is performed in the same wearing parameters and mounting parameters as those in embodiment 1.

FIG. 4 illustrates the rationale that the peripheral defocus decreases as the value of the target base curve used during the optimization loop increases.

Embodiment 3

Table 2a, Table 2b illustrate a third embodiment, wherein the ophthalmic lenses are a traditional single vision lens 6 with a spherical front and rear surface when only a sphere correction is prescribed (the prescribed cylinder is null), a comparative single vision lens 7 with a spherical front surface and rear surface that was optimized for enhanced vision in all central vision gaze directions, and a single vision lens 8 determined using the method of the invention that was designed starting from the Lens 7. All lenses in Table 2a, 2b have a prescribed sphere SPH value of −4 diopters. The base curve value of the initial lens 8 is the same value as the base curve value of the actual lens 8 shown in Table 2a.

The determination of the lens 8 is performed in the same wearing parameters and mounting parameters as those in embodiment 1.

The peripheral defocus values are estimated for horizontal and vertical peripheral gaze directions having an angle ranging from 30 degrees to 50 degrees from the primary central vision gaze direction.

The maximum peripheral defocus value for each peripheral angle is the maximum value from four values at horizontal and vertical peripheral gaze directions (P°,0), (−P°,0), (0,P°)(0,−P°) having a certain angle of P degrees (P=30, 35, 40, 45, 50) from the primary central vision gaze direction.

TABLE 2a

| Lens | Base curve (D) | Target base curve (D) | Maximum Peripheral defocus value (D) at peripheral angle (°) 30 | 35 | 40 | 45 | 50 | Maximum edge thickness (mm) @ diam. 60 | PPO - MeanSphere at X-20 mm off-axis (D) |
|---|---|---|---|---|---|---|---|---|---|
| Lens 6 | 5 | — | 1.48 | 1.78 | 2.03 | 2.18 | 2.20 | 4.87 | 0.21 |
| Lens 7 | 5 | 2.6 | 1.59 | 1.98 | 2.35 | 2.65 | 2.82 | 5.16 | −0.33 |
| Lens 8 | 5 | 8 | 1.23 | 1.50 | 1.72 | 1.85 | 1.85 | 4.70 | 0.49 |

TABLE 2b

| Lens | Base curve (D) | Peripheral defocus value (D) at peripheral angle (°) 30 | 35 | 40 | 45 | 50 |
|---|---|---|---|---|---|---|
| Lens 8 vs Lens 6 | 5 | −16% | −16% | −15% | −15% | −16% |

From Tables 2a and 2b, it can be observed that the peripheral defocus value of lens 8 is reduced for the peripheral gaze directions between 30 degrees and 50 degrees by more than 15% compared to the Lens 6 having the same base curve as +5 diopters. It can also be noticed that for the Lens 7 and Lens 8 with the same base curve as +5 diopters, the peripheral defocus value is reduced for the lens 8 with a higher target base curve of +8 diopters compared to the Lens 7 with a target base curve of +2.6 diopters.

From Table 2a, it can be also observed that the traditional single vision Lens 6 and the Lens 8 with the same base curve as +5 diopters have comparable edge thicknesses considering a lens diameter of 60 mm. Besides, the optical performance in central vision is preserved as the power error at a horizontal position 20 mm from the fitting cross is within the range of +/−0.5 diopters.

Embodiment 4

Table 3 illustrates a fourth embodiment, wherein the ophthalmic lenses are a set of traditional single vision lenses StockLens Ai (i=1 to 8) having a spherical front and spherical rear surface when only a sphere correction is prescribed (the prescribed cylinder is null), and a series of single vision lenses Bm (m=1 to 8) having a high base curve value as +5 Diopters considering a refractive index of 1.53 and optimized target base curves determined by the method of the invention. The base curve value of the initial lens Bm (m=1 to 8) is the same value as the base curve value of the actual lens Bm (m=1 to 8) shown in Table 3.

The determination of each single vision lens Bm was performed in the same wearing parameters and mounting parameters as those in embodiment 1, except that the pantoscopic angle is −6° and the wrap angle is 0°.

The maximum peripheral defocus value is the maximum value from four values at horizontal and vertical peripheral gaze directions (30°,0), (−30°,0), (0,30°)(0,−30°) having 30 degrees from the primary central vision gaze directions.

TABLE 3

| SPH (D) | Base curve (D) | Target base curve (D) | Maximum Peripheral defocus value (D) |
|---|---|---|---|
| Lens Bm (m = 1 to 8) | | | |
| −1 | 5 | 15 | 0.91 |
| −2 | 5 | 14 | 1.00 |
| −3 | 5 | 13 | 1.07 |
| −4 | 5 | 8.2 | 1.18 |
| −5 | 5 | 6 | 1.23 |
| −6 | 5 | 4.7 | 1.31 |
| −7 | 5 | 3.8 | 1.39 |
| −8 | 5 | 3.1 | 1.43 |
| StockLens Ai (i = 1 to 8) | | | |
| −1 | 4.27 | — | 1.00 |
| −2 | 3.82 | — | 1.20 |
| −3 | 2.93 | — | 1.45 |
| −4 | 2.48 | — | 1.67 |
| −5 | 2.25 | — | 1.83 |
| −6 | 2.03 | — | 1.98 |
| −7 | 1.65 | — | 2.16 |
| −8 | 1.65 | — | 2.22 |

From Table 3, it can be observed that for all prescribed sphere SPH values from −1 diopter to −8 diopters, the maximum peripheral defocus values are smaller for the Lenses Bm determined by the method of the invention than for the StockLens Ai.

FIG. 5*a*, 5*e*, and 5*f* illustrate a single vision lens B4 having a prescribed sphere SPH value as −4 Diopters in Table 3.

FIG. 5*b*, 5*c* and 5*d* illustrate one single vision lens $A_4$ having a prescribed sphere value of −4D Diopters from StockLens Ai in Table 3.

FIGS. 5*a* and 5*b* illustrate maps of the peripheral defocus values over a set of peripheral gaze directions covering a cone of half-angle 30 degrees and surrounding the primary central gaze directions. The boundaries are (−40 degrees, +40 degrees) for both the $\alpha_P$ and the $\beta_P$ angles.

FIG. 5*c* and FIG. 5*e* illustrate maps of the central vision optical power.

FIG. 5*d* and FIG. 5*f* illustrate maps of the central vision residual astigmatism.

It appears that the peripheral defocus values at the boundaries for both the $\alpha_P$ and the $\beta_P$ angles are reduced compared to the prior art single vision stock lenses, while the central vision performance including mean power error and the central vision residual astigmatism is preserved.

Embodiment 5

FIG. 6*a* and FIG. 6*b* illustrate a fifth embodiment, wherein the ophthalmic lenses are a comparative progressive lens 9 with an addition value as +2 diopters and a short progression length as 14.5 mm (FIG. 6*b*), and a progressive lens 10 (FIG. 6*b*) determined by the method of the invention having a high base curve value as +5 diopters and optimized target base curves, and the Lens 10 is designed starting from the Lens 9.

FIGS. 6*a* and 6*b* illustrate maps of the peripheral defocus values over a set of peripheral gaze directions covering a cone of half-angle 30 degrees and surrounding the primary central gaze directions. The boundaries are (−40 degrees, +40 degrees) for both the $\alpha_P$ and the $\beta_P$ angles.

It can be observed that the peripheral defocus value of the progressive lens 10 is reduced compared to the progressive lens 9.

All previous examples illustrate the reduction of peripheral hyperopic defocus values in the case of myopic wearers.

The method for determining an ophthalmic lens intended to reduce peripheral defocus values according to the invention also applies to hyperopic wearers, who present peripheral myopic defocus.

Embodiment 6

Embodiment 6 shows the resulting reduction in peripheral defocus values in the case where the wearer is hyperopic and where peripheral myopic defocus is to be reduced.

Table 4 illustrates a sixth embodiment, wherein the ophthalmic lenses are a traditional single vision lens 11 with a spherical front and rear surface when only a sphere correction is prescribed (the prescribed cylinder is null), and a single vision lens 12 determined using the method of the invention. Both lenses in table 4 have a prescribed sphere SPH value of +4 diopters.

The minimum peripheral defocus value is estimated over a set of peripheral gaze directions covering a cone of half-angle 30 degrees and surrounding the primary central gaze directions.

The determination of lens 12 was performed in the same wearing parameters and mounting parameters as those in embodiment 1, except the pantoscopic angle is −6° and the wrap angle: 0°.

TABLE 4

| SPH (D) | Base curve (D) | Target base curve (D) | Minimum Peripheral defocus value (D) |
|---|---|---|---|
| Lens 11 | | | |
| 4.00 | 8.00 | — | −1.64 |
| Lens 12 | | | |
| 4.00 | 8.00 | 11.00 | −1.34 |

From Table 4, it can be observed that for Lens 11 and Lens 12 with the same base curve as +8 diopters considering a refractive index of 1.53, the minimum peripheral defocus value reduction is 0.3 D (~18%).

FIGS. 7*a* and 7*b* represent the map of central vision optical power and the map of the central vision residual astigmatism on the front surface of the lens 12.

FIGS. 7*c* and 7*d* represent the map of central vision optical power and the map of central vision residual astigmatism on the front surface of the lens 11.

It appears that the central vision performance including mean power error and the central vision residual astigmatism is preserved.

Embodiment 7

Embodiment 7 presents the results obtained where different wearing parameters and mounting parameters are taken into account to minimize the peripheral defocus value.

Table 5 and Table 6 illustrates a seventh embodiment, wherein the ophthalmic lenses are a traditional single vision lens 13 with a spherical front and rear surface when only a sphere correction is prescribed (the prescribed cylinder is null), and a single vision lens 14 determined using the method of the invention.

In Table 5, the maximum peripheral defocus value is the maximum value from four values at horizontal and vertical peripheral gaze directions (30°,0), (−30°,0), (0,30°), (0,−30°) having an angle of 30° from the primary central vision gaze direction. FC denotes the fitting cross position of the ophthalmic lens, P denotes the pantoscopic angle in degrees and G denotes the wrap angle in degrees.

TABLE 5

| Base curve (D) | Maximum Peripheral defocus value (D) FC(0, +3) P-6G0 | FC(0, 0) P-6G0 | FC(0, 0) P-8G5 |
|---|---|---|---|
| Lens 13 | | | |
| 5 | 1.09 | 1.35 | 1.48 |
| Lens 14 | | | |
| 5 | 1.05 | 1.18 | 1.23 |

TABLE 6

| Base curve (D) | Gain in maximum peripheral defocus value reduction (%) FC(0, +3) P-6G0 | FC(0, 0) P-6G0 | FC(0, 0) P-8G5 |
|---|---|---|---|
| Lens 14 versus Lens 13 | | | |
| 5 | −4% | −13% | −16% |

From Table 6, it can be observed that for the Lens 13 and Lens 14 with the same base curve as +5 diopters, different wearing parameters and mounting parameters have influence on the gain in peripheral defocus value reduction when applying the method of the invention.

Embodiment 8

Table 7 illustrates an eight embodiment, wherein the ophthalmic lenses are a traditional single vision lens 15 with a spherical front and rear surface when only a sphere correction is prescribed (the prescribed cylinder is null), and a single vision lens 16 determined using the method of the invention. All lenses in Table 7 have a prescribed sphere SPH value of −4 diopters, and the same base curve as +5 diopters considering a refractive index of 1.53.

For the Lens 15 and Lens 16, the peripheral defocus values are estimated for the horizontal and vertical peripheral gaze directions having an angle ranging from 30 degrees to 50 degrees from a central vision gaze direction being inclined 20° downward with respect to the primary central vision gaze direction.

The peripheral defocus values are estimated for the horizontal and vertical peripheral gaze directions having an angle ranging from 30 degrees to 50 degrees from the primary central vision gaze direction.

The maximum peripheral defocus value for each peripheral angle is the maximum value from four values at horizontal and vertical peripheral gaze directions (P°,0), (−P°,0), (0,P°)(0,−P°) having a certain angle of P degrees (P=30, 35, 40, 45, 50) from the primary central vision gaze direction.

The determination of lens 15-16 was performed in the same wearing parameters and mounting parameters as those in embodiment 1.

TABLE 7

| Lens | Base curve (D) | Target base curve (D) | Maximum Peripheral defocus value (D) at peripheral angle (°) 30 | 35 | 40 | 45 | 50 |
|---|---|---|---|---|---|---|---|
| Lens 15 | 5 | — | 1.29 | 1.64 | 2.00 | 2.36 | 2.68 |
| Lens 16 | 5 | 8 | 1.16 | 1.49 | 1.83 | 2.15 | 2.44 |

| Lens | Base curve (D) | Gain in Maximum Peripheral defocus value (D) at peripheral angle (°) 30 | 35 | 40 | 45 | 50 |
|---|---|---|---|---|---|---|
| Lens 16 vs Lens 15 | 5 | −10% | −9% | −9% | −9% | −9% |

In the case where the central vision gaze direction is inclined 20° downward with respect to the primary central vision gaze direction, the gain in maximum peripheral defocus value reduction between the lens 16 and the lens 15 in table 7 is about 10%.

It is to be noticed that the lens determined by the method of the invention could reduce the peripheral defocus value for several central vision gaze directions.

The invention claimed is:

1. A method for determining an ophthalmic lens for a wearer and suitable for correcting the wearer's vision, the method comprising the steps of:

a) obtaining wearing data including prescription data pertaining to an eye of the wearer, b) defining an initial ophthalmic lens having a front surface and a rear surface such that the initial ophthalmic lens complies with the prescription data for a given central vision gaze direction, c) determining a virtual lens by an optimization process comprising the following sub-steps:

c1) defining a target lens, c2)—defining one defined surface among the front surface of the virtual lens and the rear surface of the virtual lens to be identical to a counterpart surface of the initial ophthalmic lens among the front surface or the rear surface of the initial ophthalmic lens, modifying the other surface of the virtual lens so as to match target optical characteristics of the target lens, checking whether peripheral defocus values of the virtual lens satisfy a predetermined criterion, c3) if the predetermined criterion is not satisfied, reiterating successively sub-steps c1), c2) and c3), d) determining the ophthalmic lens as being the virtual lens at the end of step c).

2. The method according to claim 1, wherein:

in sub-step c1), the target lens is defined by:

defining the front surface and the base curve of the target lens, calculating the rear surface of the target lens so that the target lens complies with the prescription data at a given gaze direction, calculating target optical characteristics of the target lens over a set of central gaze directions, in sub-step c2):

the defined surface is the front surface of the virtual lens, modifying the other surface of the virtual lens comprises optimizing the rear surface of the virtual lens so as to minimize the difference between virtual optical characteristics of the virtual lens and the target optical characteristics of the target lens over said set of central gaze directions.

3. The method according to claim 2, wherein:

in sub-step c2) the peripheral defocus values are calculated for at least one set of given peripheral gaze directions, in sub-step c3), reiterating sub-step c1) comprises modifying the base curve of the target lens with respect to the value of the previous iteration.

4. The method according to claim 3, wherein the predetermined criterion is at least one of the following: a maximum absolute value of the calculated peripheral defocus values, a mean absolute value of the calculated peripheral defocus values, or a predetermined number of iterations of sub-steps c1), c2) and c3).

5. The method according to claim 3, wherein the given central gaze direction is the primary gaze direction.

6. The method according to claim 3, wherein said cone has a half-angle of more than 25 degrees.

7. The method according to claim 3, wherein:

in step a) the wearing data further comprise wearing parameters of the ophthalmic lens, the target lens is further defined by defining target wearing parameters such as a pantoscopic tilt angle, a wrap angle of the target lens and the distance between the target lens and the wearer's eye, in sub-step c3), reiterating sub-step c1) further comprises modifying the target wearing parameters.

8. The method according to claim 3, wherein:

in step a), the wearing data further comprise mounting parameters of the ophthalmic lens, the target lens is further defined by defining target mounting parameters such as a location of a fitting cross of the target lens, in sub-step c3), reiterating sub-step c1) further comprises modifying the target mounting parameters.

9. The method according to claim 3, wherein:

the prescription data comprise a prescribed mean spherical power value and, in sub-step c2) calculating the peripheral defocus values of the virtual lens comprises the steps of:

defining an ergorama function associating each peripheral gaze direction in said cone to an object point and to the distance between said object point and the wearer, for each peripheral gaze direction:

computationally propagating a peripheral ray departing from the associated object point through the virtual lens and the wearer's eye pupil center or eye rotation center and computing a peripheral mean optical power, computing the difference between the prescribed mean spherical power value and the peripheral mean optical power, computing the peripheral defocus value by adding from said difference a modelled eye defocus value at said peripheral gaze direction.

10. The method according to claim 2, wherein the base curve of the initial ophthalmic lens is comprised between 3 diopters and 8 diopters considering a reference refractive index of 1.53.

11. The method according to claim 1, wherein step c) further comprises a sub-step c21) preceding sub-step c3) consisting of, checking whether a central vision optical characteristics of the virtual lens satisfies the predetermined criterion.

12. The method according to claim 11, wherein the central vision optical characteristics are based on the mean spherical power value, and:

in a given radius from the distance reference point of the ophthalmic lens, the optical power of the ophthalmic lens does not differ from the prescribed mean spherical power value by more than:

0.125 diopter when the prescription data comprise a prescribed mean spherical power value between −6 diopters and +4 diopters, or 0.25 diopter when the prescription data comprise a prescribed mean spherical power value below −6 diopters or above +4 diopters.

13. An ophthalmic lens determined by the method according to claim 1.

14. An ophthalmic lens, having an aspherical rear face, a rotationally symmetrical front face and a base curve higher than 3 diopters, matching prescription data pertaining to an eye of a wearer at a primary reference point, characterized in that said ophthalmic lens presents, for a set of peripheral gaze directions comprised within a cone of half-angle 30° having an apex located at the wearer's eye pupil center or eye rotation center and surrounding a central vision gaze direction corresponding to the primary reference point, peripheral defocus values reduced in comparison to another ophthalmic lens comprising a front face identical to the front surface of the ophthalmic lens and a sphero-torical rear face, wherein the other ophthalmic lens matches the prescription data at the primary reference point.

15. An ophthalmic lens according to claim 14, wherein the peripheral defocus values are reduced by more than 10%.

* * * * *